US005566208A

United States Patent [19]
Balakrishnan

[11] Patent Number: 5,566,208
[45] Date of Patent: Oct. 15, 1996

[54] ENCODER BUFFER HAVING AN EFFECTIVE SIZE WHICH VARIES AUTOMATICALLY WITH THE CHANNEL BIT-RATE

[75] Inventor: Mahesh Balakrishnan, Briarcliff Manor, N.Y.

[73] Assignee: Philips Electronics North America Corp., New York, N.Y.

[21] Appl. No.: 214,910

[22] Filed: Mar. 17, 1994

[51] Int. Cl.$^6$ ............................................. H04B 1/66
[52] U.S. Cl. ......................... 375/240; 375/242; 348/419; 370/84
[58] Field of Search ........................... 375/25, 122, 118; 370/84, 95.1, 105.3, 60, 60.1; 348/384, 419; 364/239, 239.1, 239.6

[56] References Cited

U.S. PATENT DOCUMENTS

| | | | |
|---|---|---|---|
| 4,706,260 | 11/1987 | Fedele et al. | 348/419 |
| 4,706,265 | 11/1987 | Furukawa | 375/122 |
| 5,038,209 | 8/1991 | Hang | 348/419 |
| 5,159,447 | 10/1992 | Haskell et al. | 375/27 |
| 5,272,728 | 12/1993 | Ogawa | 375/118 |
| 5,365,552 | 11/1994 | Astle | 375/118 |

OTHER PUBLICATIONS

"Constraints on Variable bit-rate Video for ATM Networks" IEEE vol. 2 No. 4. Amy R. Reibman et al. Dec. 1992.

*Primary Examiner*—Stephen Chin
*Assistant Examiner*—T. Ghebretinsae
*Attorney, Agent, or Firm*—Michael E. Marion

[57] ABSTRACT

The effective (or logical) size of the encoder buffer in a video transmission system is varied with the transmission bit-rate. Also, a minimum fill level is maintained in the encoder buffer whenever the transmission rate is too high to assure otherwise that the decoder buffer will not overflow or underflow. The encoding rate is varied so as to maintain a fill level in the encoder buffer within limits. In the preferred embodiment, the logical encoder buffer has a size which is maintained at $R\Delta T(1-m_1)-M$, where R is the average transmission bit-rate, which may vary, $\Delta T$ is the fixed delay between the encoding and decoding processes for a transmitted video signal, $R(1-m_m)$ is the minimum instantaneous transmission rate that the communication system achieves at average rate R, and M is the maximum total buffer storage in the communication system. When the decoder buffer has a size less than $R\Delta T(1+m_2)$, where $R(1+m_2)$ is the maximum instantaneous transmission rate at average rate R, the encoder buffer fill level is maintained above a minimum level that is equal to the amount by which the decoder buffer is less than $R\Delta T(1+m_2)$.

25 Claims, 4 Drawing Sheets

ENCODER BUFFER HAVING AN EFFECTIVE SIZE WHICH VARIES AUTOMATICALLY WITH THE CHANNEL BIT-RATE

BACKGROUND OF THE INVENTION

1. Field of the Invention

This invention relates generally to transmission of compressed digital information having a constant time delay constraint over a transmission system having an effective transmission bit-rate which may vary, and more particularly to management of buffer storage and control of variable bit-rates in such systems.

2. Description of the Related Art

Currently there is much interest in creating systems which can efficiently deliver digital video on electrical or optical transmission lines into homes and businesses. Delivery of video movies to customers on demand is one application. Another is interactive home television. The so-called digital information superhighway concept includes the notion that video signals will be efficiently delivered just as telephone signals are today.

Figure 1:
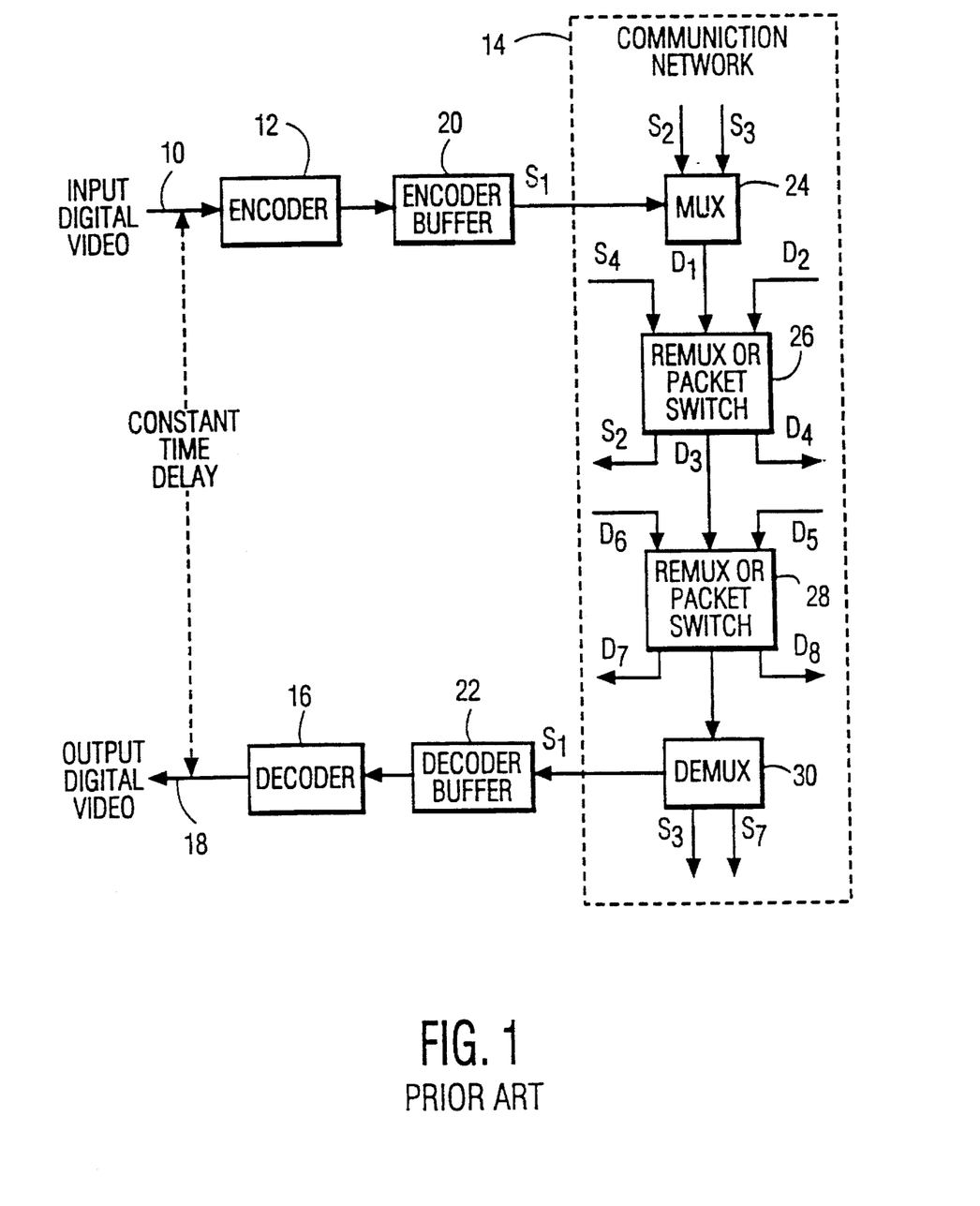
FIG. 1 is a block diagram of a conventional system for transmitting encoded video in real time.

To do this, video data must be compressed (usually called encoded) before transmission to a destination and then decompressed (usually called decoded) at the destination for display. FIG. 1 shows a typical prior art system. A digital video input signal 10 is compressed by encoder 12, transmitted to a destination site by a communication network 14, and decompressed by a decoder 16 to produce an output digital video signal 18.

One requirement that real time transmission of video information imposes is that the encoded information for each successive video frame must be available for decoding and display at the destination when needed. If the encoded information for a video frame is not available at the decoder when it is needed, a video frame (or part of a frame) cannot be produced for display and video quality will be degraded. Once display of a video sequence is started at the receiver, a time delay is established between the compression process at the encoder and the decompression process at the decoder. This time delay must remain constant if there are to be no freeze frames or skipped frames. Herein, this will be called the constant time delay constraint.

A constant time delay is made possible by anticipating variation in bit rate flow and accommodating it with buffering. The buffers must be partly filled so they can accept or deliver bits as required to accommodate anticipated bit rate flow variations. Appropriate time delay is introduced so that the buffers become suitably filled partially as desired before bits are released to the decoder for display.

One source of bit rate flow variation is in the encoder itself. Efficient compression (or encoding) algorithms (including the ones used in the widely accepted MPEG-1 and MPEG-2 standards created by the Moving Pictures Experts Group) do not compress (or encode) digital information at a constant compression ratio. In systems of this type, not every pixel, block, macroblock or frame of video is compressed to the same number of bits. Thus the number of bits produced by an encoder of this kind in a unit of time varies with time. The compression ratio (i.e., ratio of input bits to output bits) resulting from use of such algorithms typically varies with the content of the digital information being compressed. Encoders of this type which produce an output bit flow that is not uniform are said to do "variable-rate encoding". Any real time video transmission capability that meets the MPEG standard must accommodate this variation in the rate at which bits are generated by the MPEG compression (or encoding) algorithms. Typically this is done by providing buffer storage at the encoder (i.e., buffer 20 in FIG. 1) and at the decoder (i.e., buffer 22 in FIG. 1). In such a system, bits may leave the encoder buffer at a constant rate (even in the presence of such variable-rate encoding), so encoders of this kind are called constant output-rate encoders.

A second source of bit rate flow variation is the communication system. In reality, even for constant output-rate encoders, the communication system is usually multiplexed in some fashion, so groups of bits (rather than individual bits) actually leave the encoder buffer at a uniform rate. This does not necessarily mean, however, that groups of bits entering the communication system at a uniform rate also will be delivered by the communication system to a destination at a uniform rate. Whenever the communication system employs packetizing or there is any remultiplexing or switching of digital streams in the communication system, data groups experience variable delays in transmission time and data groups arrive at the decoder buffer in a bursty fashion.

A typical transmission system is shown in FIG. 1. Encoder buffer 20 becomes the source of data stream $S_1$. A multiplexer 24 multiplexes a plurality of source data streams $S_1$–$S_3$ according to a packet scheduling algorithm to generate one multiplexed bit-stream $D_1$. This bit-stream is then transmitted over the transmission facility 14, which typically includes a number of remultiplexing or packet switching nodes 26, 28 and a demultiplexer 30 serving decoder 16. Bit-stream $D_1$ does not remain in the same multiplexed format all the way to demultiplexer 30. At remultiplexing or packet switching stage 26, for example, one or more additional source data streams $S_4$ might be added, and one or more additional bit-streams $D_2$ might be added as well. Also, the output from this stage might be divided into two or more output bit-streams $D_3$, $D_4$, and one or more demultiplexed individual data streams (such as $S_2$ as shown) might be output as well. It is assumed that the $S_1$ data stream is contained in multiplexed output bit-stream $D_3$, which enters another remultiplexing or packet switching node 28. Additional bit-streams $D_5$, $D_6$ might be added at this stage and bit-streams $D_7$–$D_9$ might depart. Bit-stream $D_9$ is assumed to contain data stream $S_1$ and enters demultiplexer 30, which reproduces data stream $S_1$.

Figure 2:
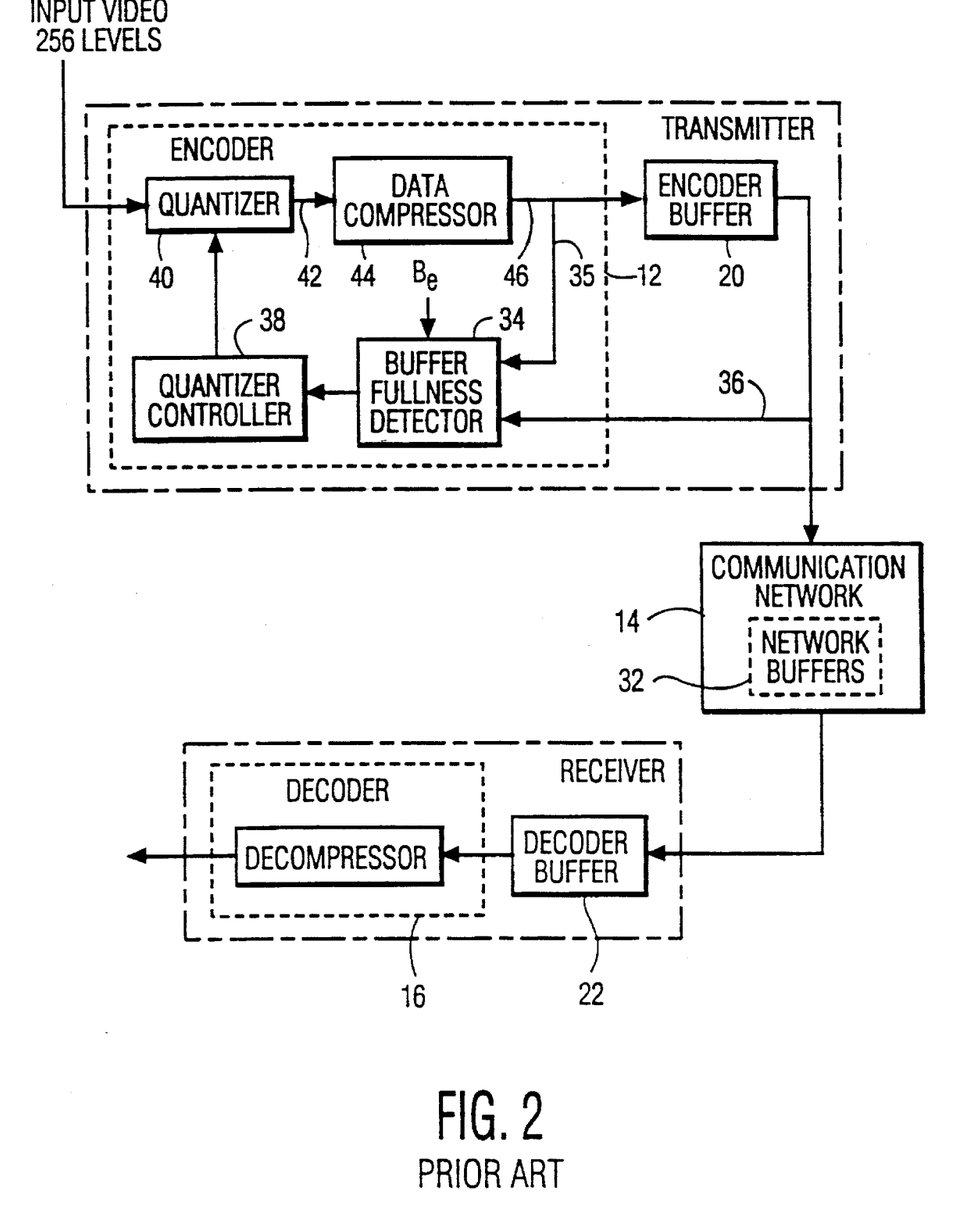
FIG. 2 is another block diagram of a conventional system for transmitting encoded video in real time with the encoder shown in more detail.

It is important to note that while the output data stream $S_1$ contains the same packets of data that entered the communication network and in the same order, the time spacing of the packets generally has been altered because the relative locations of individual packets are altered when $D_1$ is converted into $D_3$ and $D_3$ is converted into $D_9$. The specific kind of transmission network is not important. However, it is important to understand that the kinds of transmission facilities described will necessarily include some buffer storage to accommodate remultiplexing or packet switching. Data packets cannot become displaced relative to each other unless there is some buffer storage to hold the data packets while relative displacement occurs. In FIG. 2 this buffering is generally represented as buffers 32. This network buffer storage is not taken into account in the conventional model for encoding systems.

Additional complexity arises in satisfying the constant time delay constraint when the transmission system itself contains buffer storage in addition to the buffer storage at the encoder and at the decoder. The encoder and decoder buffers cannot be permitted to overflow (since this would result in loss of data and produce a skip frame error) and the decoder buffer (at least) cannot be permitted to underflow (i.e., not have stored bits when stored bits are needed for decompression) because this will produce a freeze frame error.

It becomes even more complex to guarantee the constant time delay constraint if the average bit-rate at which an encoder operates can vary over time. Such encoders are called "variable output-rate" encoders. Encoders of this type are used, for example, in order to support joint bit-rate control or statistical multiplexing. These systems are desirable because it is generally better to allow the transmission bandwidth allotted to existing active communication links or channels in a network to be degraded (i.e., continue at a reduced bandwidth) when necessary rather than have some of them terminated. Also, much more sophisticated network management can be implemented if the bandwidth (i.e., bit-rate allotted to each link or channel) can be increased and decreased.

Variable output-rate encoding cannot be accommodated merely by providing additional buffer storage, at least not buffer storage of a reasonable size. A change in the average bit-rate at which the encoder is operating requires a corresponding change in the transmission channel-rate that the communication system allots to this encoder. However, synchronization of the two bit-rate changes is not required if there is adequate buffering to cover the asynchrony.

MPEG standards were not designed to accommodate variable output-rate encoding. Furthermore, the MPEG standards have specified the decoder in great detail, including the size of the decoder buffer. This was done because it is anticipated that there will be very many decoders and very few encoders in a typical system. In an on-demand video system, for example, there will be a decoder in each customer's home or business and only one encoder at the supplier of the on-demand video service. Buffer storage is too costly to place any more of it than necessary at each decoder. Therefore, the MPEG Committee specified the size of the decoder buffer in the MPEG-1 and MPEG-2 standards and these standards have been widely accepted. MPEG-2, for example, specifies that the decoder buffer will be 1.75 MB and allows transmission rates of up to 15 MB. This buffer size equals about 1.2 second of storage at a 1.5 MB transmission rate and only about 0.12 seconds of storage at a 15 MB transmission rate.

While the MPEG Committee specified the decoder in great detail (and assumed a constant bit-rate system), the encoder was left substantially unspecified (except of course that it must provide data compressed in a specified manner). If variable bit-rate operation is desired in a video transmission system which uses decoders that meet the MPEG-1 or MPEG-2 standard, the encoder must be designed somehow to accommodate the bit-rate variation without involvement from the decoder and without changing the fixed decode buffer size specified by the MPEG standards.

SUMMARY OF THE INVENTION

It is an object of this invention to provide a system which will compress or encode video information for transmission on a communication network having a transmission bit-rate allocated to such compressed video information which may vary and a buffer at the destination decompression or decoding receiver of fixed size.

It is also an object to provide such a system without involving the decoder whenever the bit-rate of the channel being used to transmit the compressed video changes.

Another object is to provide an encoder which meets the MPEG standards and can be used on a transmission network having a variable average transmission bit-rate.

Still another object is to provide a system for delivering compressed video information over a transmission network having a variable transmission bit-rate.

These and further objects and features have been achieved by the present invention by making the effective (or logical) size of the encoder buffer vary with the transmission bit-rate R and by maintaining a minimum fill level in the encoder buffer whenever the transmission rate R is too high to assure otherwise that the decoder buffer will not overflow or underflow. The encoding rate is varied so as to maintain a fill level in the encoder buffer within limits.

In the preferred embodiment, the logical encoder buffer has a size which is maintained at $R\Delta T(1-m_1)-M$, where: R is the average transmission bit-rate, which may be varied; $\Delta T$ is the fixed delay between the encoding and decoding processes for a transmitted signal; $R(1+m_1)$ is the minimum instantaneous transmission rate that the communication system achieves at average rate R; and M is the maximum total buffer storage in the communication system. When the decoder buffer has a size less than $R\Delta T(1+m_2)$, the encoder buffer fill level is maintained above a minimum level that is equal to the amount by which the decoder buffer is less than $R\Delta T(1+m_2)$.

In order to achieve this, the encoder includes a logical encoder buffer size controller that receives prospective changes in the transmission rate R from the applicable channel-rate controller in the communication system and also knows the values of certain system parameters, such as the size of the decoder buffer, the amount of buffer storage in the communication system, if any, and the size of any significant instantaneous variation in transmission rate.

DETAILED DESCRIPTION

While this invention may be used to transmit any kind of digital information over a transmission system in which the average bit-rate of transmission may vary and there is a constant time delay constraint between encoding and decoding, it is particularly useful in transmitting video data (and accompanying audio data) in compressed form over such a variable bit-rate transmission system. Accordingly, the invention will be described in the context of a video application of this invention, but it should be understood that the invention being described is not limited to transmission of video and audio data, but may be used as well to transmit a wide variety of digital information.

Traditionally, real time video encoding systems have been modelled as constant output bit-rate sources, where any variation in the actual instantaneous encoding bit-rate (i.e., variable-rate encoding) is handled by a buffer, both at the encoder and at the decoder. In such a system, bits leave the encoder buffer and enter the decoder buffer at a constant rate. The transmission system connecting the encoder buffer and decoder buffer has been modelled generally as a constant bandwidth channel (i.e., operating at a constant bit-rate). Buffering within the transmission system has been largely ignored. This is the model that was used to create the MPEG standards.

While MPEG does not specify how the encoder will keep the encoder buffer from overflowing or underflowing, the usual way to assure this is to provide some kind of control loop at the encoder, which senses an increasing fullness of the encoder buffer and slows down the rate at which bits are being placed in the encoder buffer to prevent overflow of the encoder buffer. If the control loop senses that the encoder buffer is getting empty, it increases the rate at which bits are being placed in the encoder buffer to prevent underflow (i.e., depletion) of the encoder buffer.

Since the frame rate is constant for video signals and the compression ratio is not under direct control, the usual way to vary the rate at which bits are being placed in the encoder buffer is to vary the number of bits representing each frame by representing each pixel with more or less bits as required. The range of different pixel amplitude levels corresponding to a single digital value is called the quantization size and it is determined dynamically by a quantization size controller. A quantizer and quantization size controller are part of a typical video encoder. They allow control of the quantization size of the video signal that is being compressed. For example, normal video might represent the amplitude of each pixel as one of 256 levels (represented with 8 bits). At a low quantization size, each pixel is still represented by many different amplitude levels (theoretically as many as the input quantization of 256 levels). At a high quantization size, however, the number of possible amplitude levels is reduced, so the amplitude of each pixel can be represented with less bits than at a low quantization size. The quantizer essentially maps the 256 possible amplitude levels for the input signal to a lesser number of possible amplitude levels for the signal that is compressed. The MPEG-1 standard allows for up to 31 possible quantization sizes and the MPEG-2 standard allows for up to 100 possible quantization sizes.

FIG. 2 illustrates functionally how quantization is used to keep the encoder buffer from underflowing or overflowing. The state of the encoder buffer 20 is determined by a buffer fullness detector 34. This determination may be done in many ways and in general may be computed or sensed. In FIG. 2, the buffer fullness detector determines buffer fullness by counting the number of bits going into the encoder buffer via line 35 and counting the number of bits coming out of the encoder buffer via line 36. The total number of bits going in less the total number of bits coming out is the total number of bits in the encoder buffer. The total number of bits in the encoder buffer is then divided by the size of the encoder buffer (i.e., the size being the total number of bits which can be placed in the encoder buffer without overflow).

The buffer fullness value is sent to an enoding rate controller (or quantizer controller) 38, which uses a predetermined algorithm to determine which one of many different quantization levels will be used by quantizer 40 for each possible fullness state of the buffer. In general, as the buffer gets fuller, the algorithm will yield a higher quantization level for use by quantizer 40, which means less bits will be used to represent each input value. For example, as shown in FIG. 2, the amplitude of a pixel of video may be represented at the input to the encoder as one of 256 levels (i.e., 8 bits of amplitude information). The finest quantization (normally called the lowest quantization) might preserve all of this information and therefore also produce 256 possible levels of amplitude. We might view the output of quantizer 40 as having 256/Q levels of amplitude. As Q gets larger, the number of possible levels of amplitude gets smaller and can be represented with fewer and fewer bits. The encoder buffer is kept from overflowing by increasing Q as the fullness of the buffer goes up. In general, this is not a linear function. Also, the encoder buffer is kept from underflowing by decreasing Q as the fullness of the buffer goes down. Again, this is not generally a linear function and the two functions may be different (i.e., the quantization level for a particular fullness value may depend upon whether the fullness values are increasing or decreasing.

Data 42 which has been quantized is then received by a digital compressor 44 and the compressed result 46 is deposited into the encoder buffer 20.

In the MPEG model, the output of the encoder buffer is conceptually connected to the input of the decoder buffer. Therefore, it doesn't take into account remultiplexing and packet switching that might exist between the encoder and the decoder. It also assumes constant bit-rate operation. So the MPEG model is not suitable when the channel bit-rate can vary. We will now develop a new model by analyzing what constraints need to be satisfied to prevent decoder buffer underflow and overflow while meeting the constant time delay constraint in the case of variable-rate coding, packetized transmission, remultiplexing and packet switching. An embodiment of this invention will then be described which meets these constraints.

Theory of the Invention

Let a unit of time be one packet slot time, T. In this time, T, multiplexer 14 transmits one packet of data from one of the sources that it is multiplexing. Packets originating from a particular source are transmitted in the packet slots that the scheduling algorithm for the multiplexer allots to that particular source. Typically, the allocation of transmission slots to the various sources is done by allocating a fixed data rate to each source. Every individual source then controls the status of its output buffer (encoder buffer for sources that are encoders), with the assumption that it has this defined amount of data rate at its disposal. Another way of doing the same thing would be to perform data rate control considering all sources. In this case, an encoder can borrow data bandwidth from another source that does not require it at that instant. In either case, we assume that it is the responsibility of an encoder to ensure that its encoder buffer neither underflows nor overflows.

Assume that in the i'th unit of time, the encoder puts $b_i$ bits into the encoder buffer. In that period of time, the multiplexer 14 removes $p\delta_{ei}$ bits, where $\delta_{ei} = 1$ if the scheduler has allotted that slot to this particular encoder and is 0 if not. p is the payload of the packet or the number of bits from the encoder buffer that go into one packet.

Let the delay between when the encoder inserts bits into the encoder buffer and when the decoder removes them from the decoder buffer, be $\Delta$ units of time. At the demultiplexer, the decoder buffer receives $p\delta_{di}$ bits in the i'th unit of time. Again, $\delta_{di} = 1$ when the decoder buffer receives a packet from the demultiplexer and is 0 when it doesn't. In the absence of remultiplexing, $\delta_{di} = \delta_{ei}$. The inherent assumption here is that the encoder system clock and the decoder system clock are in lock, since we are equating time instances measured by two different clocks.

The number of bits in the encoder buffer after time nT is $$(EB)_n = \sum_{i=1}^{n} b_i - p \sum_{i=1}^{n} \delta_{ei}. \tag{EQ1}$$

The decoder decodes the bits produced by the encoder $\Delta$ units of time after the encoder produces them. Thus, the decoder decodes $b_i$ bits in the i+$\Delta$'th slot. The status of the decoder buffer at time $(n+\Delta)T$ is therefore $$(DB)_{n+\Delta} = p \sum_{i=1}^{n+\Delta} \delta_{di} - \sum_{i=1}^{n} b_i. \tag{EQ2}$$

Substituting equation (EQ1) in equation (EQ2), we have $$(DB)_{n+\Delta} = -(EB)_n - p \sum_{i=1}^{n} \delta_{ei} + p \sum_{i=1}^{n+\Delta} \delta_{di} = \tag{EQ3}$$

$$p \left( \sum_{i=1}^{n+\Delta} \delta_{di} - \sum_{i=1}^{n} \delta_{ei} \right) - (EB)_n$$

The encoder ensures that the encoder buffer neither underflows nor overflows. If the size of the encoder buffer is $B_e$, then $$0 \leq (EB)_n \leq B_e \tag{EQ4}.$$

From equations (EQ3) and (EQ4), we have for the decoder buffer, $$p \left( \sum_{i=1}^{n+\Delta} \delta_{di} - \sum_{i=1}^{n} \delta_{ei} \right) - B_e \leq (DB)_{n+\Delta} \leq p \left( \sum_{i=1}^{n+\Delta} \delta_{di} - \sum_{i=1}^{n} \delta_{ei} \right). \tag{EQ5}$$

If the decoder buffer of size $B_d$ is to neither underflow nor overflow, the following equation must be satisfied, $$B_e \leq p \left( \sum_{i=1}^{n+\Delta} \delta_{di} - \sum_{i=1}^{n} \delta_{ei} \right) \leq B_d. \tag{EQ6}$$

Variable-Rate Operation

We will now examine the two special cases in which we are interested. In a constant non-bursty bit-rate mode (although constant non-bursty may sound redundant, we use this here to refer to a mode of operation where bits leave the encoder buffer at a constant rate), the number of bits that leave the encoder buffer in time t is Rt, where R is the output rate. However, in a discrete packetized case, the multiplexer will not be able to satisfy this for all encoders at all times and the instantaneous rate will vary. Let us bound the variation in the instantaneous channel rate by stating that the minimum instantaneous rate is $R(1-m_1)$ and the maximum instantaneous rate is $R(1+m_2)$. When $m_1=m_2=m$, this constraint implies that the instantaneous rate can vary by at most 100 m%. What is left to be determined is how we define the instantaneous rate. Note that equation (EQ6) bounds the number of bits transmitted from a source in $\Delta$ units of time, where $\Delta T$ is the delay. Therefore, we define the instantaneous rate to be equal to the number of bits that leave the encoder buffer in a period of time equal to the delay, divided by the delay. It is thus the average rate over that period of time. Thus the constraint on the multiplexer will essentially be: In $\Delta$ units of time, the number of bits allocated to the source must be at least $R(1-m_1)\Delta T$ and must be no larger than $R(1+m_2)\Delta T$.

Multiplexed Bit-Stream with Remultiplexing

Now, we consider the case where we have multiple sources being multiplexed to create one bit-stream. This bit-stream however, undergoes stages of remultiplexing in between the encoder and the decoder. Let the total number of multiplexers/demultiplexers/remultiplexers in the link be J. Of these, the first in the link is a multiplexer at the encode site, the J'th is a demultiplexer at the decode site, and the remaining J–2 are re-multiplexers. If J=2, then there are no re-multiplexers. Again, assume that the source of interest is operating at a constant output-rate R. Let $B_{oj}(n)$ denote the number of bits output by the j'th re-mux in time n, that belong to the source that we are considering. Let $B_{ij}(n)$ be the number of bits from the same source input to the j'th re-mux in time n. Thus equation (EQ6) implies that $$B_e \leq \sum_{j=2}^{J} (B_{oj}(n+\Delta) - B_{ij}(n+\Delta)) + B_{o1}(n+\Delta) - B_{i1}(n) \leq B_d. \tag{EQ7}$$

This translates to: $B_e$ is less than or equal to the number of bits removed from the encoder buffer in the last $\Delta$ units of time (or in $\Delta T$ seconds) minus the total number of bits buffered in all of the re-muxes, which in turn is less than or equal to $B_d$.

Using the same nomenclature as before, and if the maximum number of bits that can be buffered in the system (including all muxes) is M, we have $$B_e + M = R\Delta T(1-m_1) \tag{EQ8}$$

So the size of the encoder buffer is $$B_e = R\Delta T(1-m_1) - M \tag{EQ9}$$

The size of the decoder buffer, if the minimum number of bits buffered in all the multiplexers is 0, is given by $$B_d = R\Delta T(1+m_2) \tag{EQ10}.$$

Another way of writing equations (EQ9) and (EQ10) is as follows:

$$B_d = B_e + R\Delta T(m_1+m_2) + M \tag{EQ11}$$

Thus $B_e$ is the amount of decoder buffer required as a result of variable rate encoding, $R\Delta T(m_1+m_2)$ is the amount of buffer required as a result of the variation in the channel rate, and M is required as a result of the buffering in the remultiplexers. Note that if the minimum number of bits buffered in the remultiplexers is greater than zero and equal to $M_{min}$, then the extra buffering required at the decoder is not equal to M, but is $M-M_{min}$. In other words, the extra buffering required at the decoder is not in order to compensate for the maximum buffering in the remultiplexers, but is to accommodate the variation in the amount of buffering in the remultiplexers.

In this case, the delay is $B_d/(R(1+m_2))$. Again, the delay decreases monotonically with $m_2$, while the size of the decoder buffer increases monotonically with M, $m_1$, and $m_2$. In this case too as seen earlier, the size of the decoder buffer is larger than in the constant bit-rate case.

Variable Output-Rate Source

Now let us consider an encoder whose output-rate varies with time in a piecewise constant fashion. This is an accurate model for most variable output-rate encoders. Let the rate over the time period that we are considering be R and let $R_{new}$ be the new output-rate for the next period of time. As we said before, in equations (EQ9) and (EQ10), $R(1-m_1)$ is the minimum instantaneous channel rate and $R(1+m_2)$ is the maximum instantaneous channel rate allocated to this source, where the instantaneous rate is calculated over a period of time equal to the delay. Thus, the instantaneous rate of the channel can vary between $R(1-m_1)$ and $R(1+m_2)$.

One approach might be to broaden the range of $R(1-m_1)$ to $R(1+m_2)$ to cover not only instantaneous rate changes, but also the piecewise constant changes as well. Equation (EQ7) reduces to the following two equations $$B_e \leq R\Delta T(1-m_1) - M \tag{EQ12}.$$

$$R\Delta T(1+m_2) \leq B_d \quad (EQ13).$$

Thus, if the channel-rate is allowed to vary between $R(1-m_1)$ and $R(1+m_2)$, the size of the decoder buffer must be at least $(1+m_2)/(1-m_1)$ times the size of the encoder buffer. Therefore, the encoder buffer must be smaller than the decoder buffer by the ratio of the maximum rate to the minimum rate. If the minimum rate is 2 Mbps and the maximum rate is 15 Mbps (maximum rate for MPEG-2 Main Profile Main Level), this implies that the encoder buffer should be 1/7.5 times the decoder buffer. Since MPEG specifies that the decoder buffer will be 1.8 MB, this would make the encoder buffer size only 0.24 MB or 240 KB! Since the size of the encoder buffer affects the quality of the coded video to a large extent, this is not acceptable.

Since the range of $R(1-m_1)$ to $R(1+m_2)$ thus cannot be broadened to effectively cover a large piecewise change in output rate, another approach is needed. In accordance with this invention, this is provided by allowing the effective size of the encoder buffer to vary! Accordingly, we introduce a distinction between the physical and logical sizes of the encoder buffer. The physical size of the encoder buffer, which will be called $B_{ep}$, is the maximum amount of buffer memory that has been physically built into the encoder. The logical size of the encoder buffer, on the other hand, is the part of the physical encoder buffer that the encoder actually uses, which is the term called $B_e$ heretofore. The difference now is that $B_e$ will be permitted to vary dynamically. In accordance with this invention, the encoder can set the logical buffer size to be smaller than the physical buffer size in order to prevent the decoder buffer from underflowing or overflowing, as we will see below. It is the responsibility of the encoder to ensure that the encoder logical buffer never underflows or overflows.

A change in the range of output-rates at which the source operates, involves changing R to the new value $R_{new}$, and possibly changing $m_1$ or $m_2$ or both, without changing the delay. Consider the case where $R_{new}$ is greater than R. The maximum value that $R_{new}$ can take is determined by the physical size of the decoder buffer and from equation (EQ13) is given by $$R_{max} = \frac{B_d}{\Delta T(1+m_2)} \quad (EQ14)$$

However, if the encoder wishes to increase the output-rate beyond this, and still keep the delay constant, it can still do so by performing extra buffering at the encoder. This is done by ensuring that the encoder buffer never has less than a certain minimum number of bits $B_{min}$. Thus, the new version of equation (EQ4) becomes, $$B_{min} \leq (EB)_n \leq B_e \quad (EQ15).$$

As a consequence, the modified equation (EQ6) that must be satisfied to avoid decoder underflow and overflow is $$B_e \leq p \left( \sum_{i=1}^{n+\Delta} \delta_{di} - \sum_{i=1}^{n} \delta_{ei} \right) \leq B_d + B_{min}. \quad (EQ16)$$

Thus, the new version of equation (EQ13) is $$R\Delta T(1+m_2) \leq B_d + B_{min} \quad (EQ17).$$

The maximum output-rate that can be handled is now given by $$R_{max} = \frac{B_d + B_{min}}{\Delta T(1+m_2)} \quad (EQ18)$$

The portion of the logical encoder buffer which may increase and decrease (the effective logical buffer) is now $B_e - B_{min}$. However, if the amount of physical buffer $B_{ep}$ at the encoder buffer is not limited, $B_e$ can be increased as long as equation (EQ12) is not violated, thus keeping the effective logical buffer size the same as before, and is given by $$B_e - B_{min} = R\Delta T(-m_1 - m_2) - M + B_d \quad (EQ19).$$

The encoder and decoder buffer sizes are given by $$B_e = R\Delta T(1-m_1) - M \quad (EQ20)$$

$$B_d = R\Delta T(1+m_2) - B_{min} \quad (EQ21).$$

An alternate form of equation (EQ21) is $$B_d = B_e - B_{min} + R\Delta T(m_1 + m_2) + M \quad (EQ22)$$

where: $B_e - B_{min}$ is the amount of buffer required as a result of variable-rate encoding; $R\Delta T(m_1 + m_2)$ is required as a result of varying channel rate; and M is the amount of buffering required to accommodate the buffering at the remultiplexers. $B_{min}$ is the amount of buffering that needs to be done at the encoder in order to maintain the same delay at this increased output-rate. Thus, it is possible to operate at a higher output-rate and a pre-defined delay by doing at the encoder, the extra buffering that is required to keep the delay constant. However, note that the logical encoder buffer size is still less than that of the decoder buffer. Thus, it is not possible to shift any increased buffering caused by variable rate operation of the channel, to the encoder. This increased buffering which is denoted by $R\Delta T(m_1 + m_2)$ in equation (EQ22) still must be done at the decoder. Operation at the new rate can begin only after the encoder is in a position to ensure that its buffer will always have $B_{min}$ bits.

From equation (EQ18), it is easy to see that the delay and the maximum allowed value for bit-rate are related. For instance, given the size of the decoder and encoder buffers, and the fact that they have to hold bits that would be transmitted over a period of time equal to the delay, the larger the delay, the lower the maximum output-rate. If the rate has to be increased beyond a value that can be satisfied with the existing delay and decoder and encoder buffer sizes, then we would have to decrease the delay. This will result in dropped frames at the decoder.

Another parameter that can be changed is the logical size of the encoder buffer which can be set equal to a value given by equation (EQ20). This is preferable since it results in an increase in the logical size of the buffer. However, now that we have started changing the buffer sizes in a dynamic fashion, it is important to note that $B_e$ and $B_d$ are functions of time. For instance in equation (EQ16), $B_e$ is the size of the encoder buffer at time nT, and $B_d$ is the size of the decoder buffer at time $(n+\Delta)T$. Operation at the new output-rate commences with this new value of the encoder buffer size, while ensuring that equation (EQ16) is satisfied at all times. Increasing $m_2$ can be done similarly, while decreasing $m_2$ is not a problem.

Now consider the case where $R_{new}$ is less than R. To reduce R to $R_{new}$, the logical size of the encoder buffer must be reduced to $R_{new}\Delta T(1-m_1) - M$ as can be seen from equation (EQ20). This can be done as long as the number of bits in the encoder buffer is less than $R_{new}\Delta T(1-m_1)-M$. If this is not so, the encoder attempts to bring the encoder buffer to this state. Once that happens, the logical size of the encoder buffer is set to $R_{new}\Delta T(1-m_1)-M$. Now the encoder continues to operate at the same delay, while ensuring that the encoder buffer of this new size neither underflows nor overflows. This effectively ensures that the decoder buffer also doesn't underflow or overflow. Note that bringing the encoder buffer to the desired state is not difficult. Usually, the encoder buffer will be in the required state, and the switch over to the new output-rate can be done at once. If the buffer is not in the desired state, it implies that the number of bits in the encoder buffer satisfies the following relationship $$R_{new}\Delta T(1-m_1)-M \leq EB \leq R_{old}\Delta T(1-m_1)-M \quad (EQ23).$$

The likelihood of this increases when $R_{old}$ and $R_{new}$ are substantially different. One way of bringing the encoder buffer to the required state is for the encoder to start producing bits assuming the new reduced rate. Bits will be transmitted from the encoder buffer at the old higher rate resulting in the buffer becoming progressively less full. When the buffer reaches the desired state, transmission will commence at the new rate, and the logical buffer size is also reduced to the new value. The multiplexer now has to ensure that equation (EQ16) is satisfied for the new value of the encoder buffer size. Increasing $m_1$ is done similarly, while decreasing $m_1$ is not a problem.

This method of handling variable output-rate encoding allows the encoder to use a larger encoder buffer at high rates while using a smaller buffer at lower rates, thus allowing for good quality video and low delay. This is preferable over operating with a fixed small value for the encoder buffer or with a high delay. To illustrate the differences possible in the size of the encoder buffer, consider an encoder operating at a range of rates from 2 Mbps to 15 Mbps. If the size of the decoder buffer is 1.75 Mbits (MPEG-2 Main Profile Main Level), then the size of the encoder buffer in a fixed buffer size solution is 0.233 Mbits. The delay is 0.122 seconds. Using the variable encoder buffer size approach mentioned here and the same delay of 0.122 seconds, the logical size of the encoder buffer will still be 0.233 Mbits when we operate at 2 Mbps, but at 15 Mbps, the encoder buffer can be the entire 1.75 Mbits. If one desires to use the entire decoder buffer at all rates, the delay would be 0.918 seconds, $B_{min}$ will be 11.38 Mbits, and $B_e$ will be 13.13 Mbits, when operating at 15 Mbps, thus resulting in a large encoder buffer primarily for generating delay. Note that the solution presented here requires the encoder to operate in a piece-wise constant bit-rate mode. If the channel rate for a particular encoder varies between $R_{min}$ and $R_{max}$, with the encoder having no say in the matter, the encoder buffer will have to be $R_{min}/R_{max}$ times the decoder buffer size.

DESCRIPTION OF A PREFERRED EMBODIMENT

Figure 3:
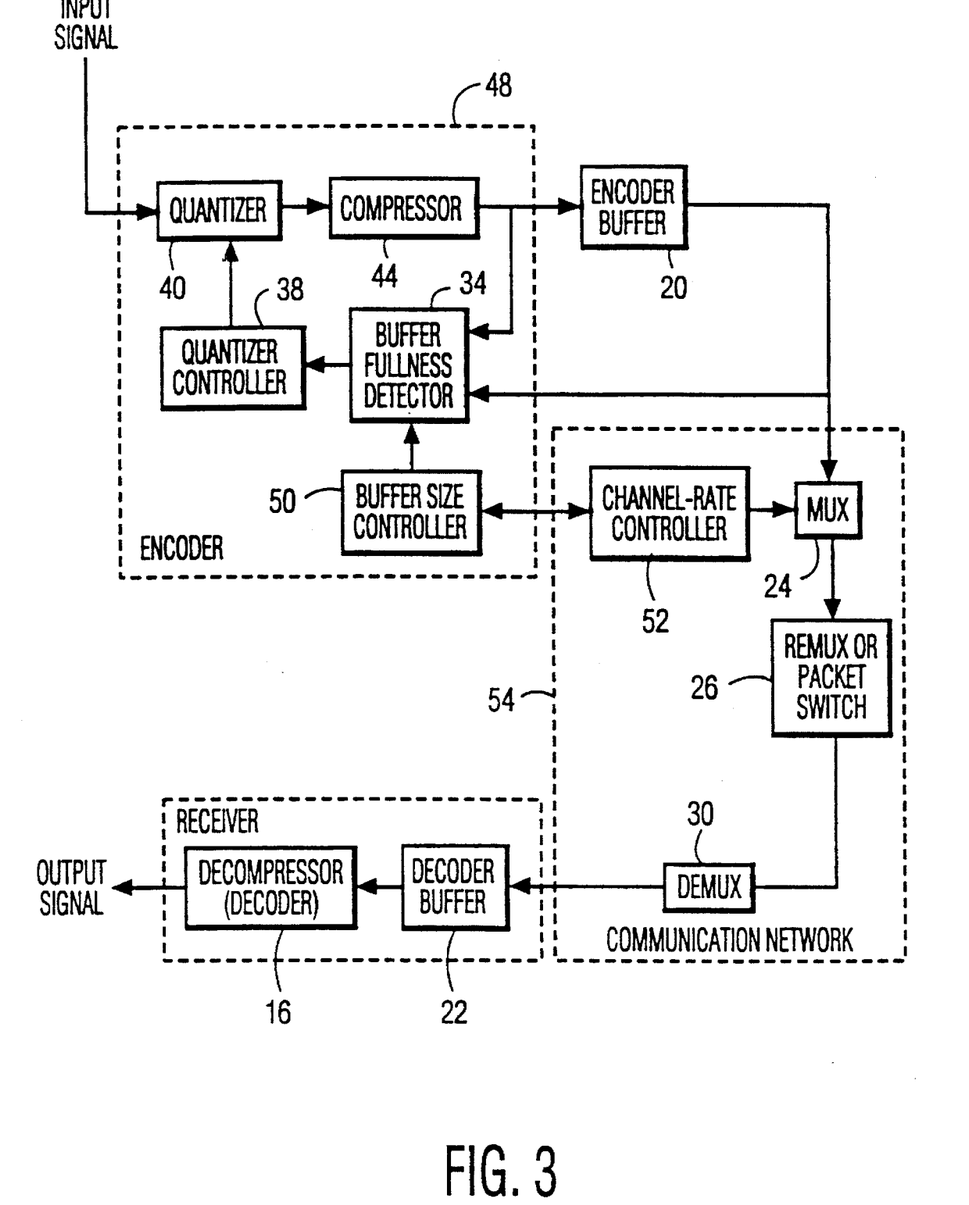
FIG. 3 is a block diagram of a system for encoding and transmitting video in real time in accordance with this invention.

FIG. 3 is a block diagram of a video communication system in accordance with this invention. The decoder in this embodiment will accommodate variable-rate compressed data transmission because the logical encoder buffer is kept at a size less than the decoder buffer size. The decoder buffer should be at least as large as that given by equation (EQ22). If the size of the decoder buffer is constrained to be a particular size (say because it must meet the MPEG standard), the other parameters in equation (EQ22) are selected so that the right side of (EQ22) is no less than the left side.

At the encoder end, the logical size of the encoder buffer is controlled by a buffer size controller 50. The logical size of the encoder buffer is defined by two terms—$B_{min}$ and $B_e$. $B_e$ is the size of the logical buffer. $B_{min}$ defines the minimum occupancy status of the logical buffer. In other words, the logical encoder buffer will always contain at least $B_{min}$ bits. The effective size of the logical encoder buffer (i.e., $B_e - B_{min}$) is used by the buffer fullness detector 34 to determine the fullness value of the encoder buffer which will be used by an encoding Rate Controller (or quantizer controller) 38 in determining a quantization size for the quantizer 40. It is important to note that the fullness measure that is being computed by detector 34 is not the fullness of the physical encoder buffer or even the fullness of the logical buffer (unless $B_{min}=0$), but rather the fullness of the portion of the logical encoder buffer that can be filled and emptied (i.e., the portion remaining after $B_{min}$ is taken away).

Figure 4:
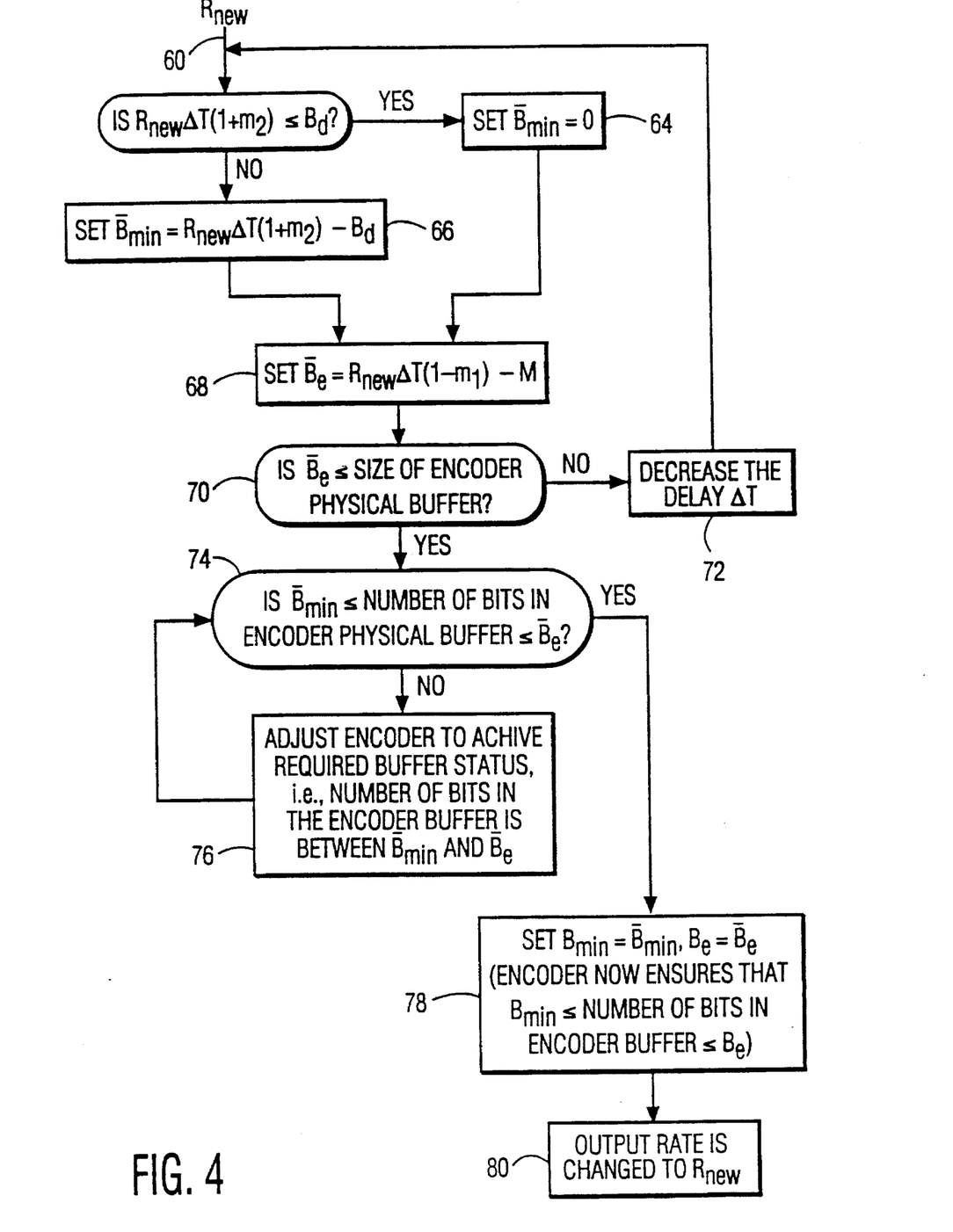
FIG. 4 is flow diagram of the encoder buffer size controller in the FIG. 3 embodiment.

Either encoder 48 or the communication system 54 can request a transmission rate change for encoder 48. Whichever one desires a change, the other must be notified and agree before a change is made. Channel-rate controller 52 is the control point for the communication network 54. Controller 52 manages multiplexer 24, which is the multiplexer handling encoder 48. Controller 52 also communicates with other control functions in the network, which are represented in FIG. 3 by system controller 56. Channel-rate controller 52 also communicates with the buffer size controller 50 of encoder 48. When a transmission rate change is desired by either the encoder 48 or channel-rate controller 52, these two controllers set up a communications dialog (i.e., handshake) and one makes a request of the other to change the transmission rate. If and when the other agrees, the change is made. FIG. 4 is flow diagram of the process which occurs at the buffer size controller 50 when a transmission bit-rate change is requested by the channel-rate controller 52. In general, the buffer size controller computes new parameters $B_{min}$ and $B_e$, but does not agree to the change until it has made sure that $B_{min}$ has been satisfied.

Referring now to FIG. 4, buffer size controller 50 receives a request to change the bit-rate to $R_{new}$ via path 60. In block 62 a determination is made as to whether or not the proposed new bit-rate $R_{new}$ results in a minimum required decoder buffer size (at the current delay $\Delta T$ and the current instantaneous bit-rate upwards variation of $m_2$) which is less than or equal to the actual decoder buffer size $B_d$. This is the constraint imposed by equation (EQ13). If the actual decoder buffer size is large enough at the proposed $R_{new}$, the minimum occupancy state of the logical encoder buffer is set to zero in block 64. If not, $B_{min}$ is set to equal the shortfall in block 66. In block 68, a new logical buffer size $B_e$ is determined, which is compared to the physical size $B_{ep}$ of the encoder buffer in block 70.

If the physical size of the encoder buffer is too small to implement the new logical buffer size required at the proposed new bit-rate $R_{new}$, either the time delay must be reduced (which will cause one or more skip frames to occur at the decoder) or else the proposed new bit-rate $R_{new}$ cannot be implemented. It is possible for the buffer size controller to inform the channel-rate controller 52 that the proposed change in bit-rate is not acceptable or that it will cause frames to be skipped. The channel-rate controller 52 typically has other alternatives available since it multiplexes typically many sources. However, in the event that the proposed bit-rate change must be implemented by encoder 48 (or possibly simply as a design choice), in FIG. 4 it has been assumed that the delay will be reduced if the physical encoder buffer is not big enough at $R_{new}$, which is done by block 72.

If (or when) the physical buffer size is large enough (either initially or after a reduction in the time delay), the number of bits in the encoder buffer is compared in block 74 with the new $B_{min}$ value determined earlier in block 66 and with the new logical buffer size $B_e$. If there are not enough bits in the encoder buffer to satisfy the new $B_{min}$ constraint, or there are too many bits in the encoder buffer to satisfy the new $B_e$ constraint, the number of bits in the encoder buffer is caused to be adjusted in block 76 until the number of bits in the encoder buffer is within the new constraints.

This may be accomplished by the buffer size controller by changing the logical buffer size supplied to the buffer fullness detector to the new value in advance of telling the channel-rate controller that a new bit-rate is acceptable. If it is the $B_{min}$ constraint that is not satisfied, the buffer size controller might increase the size of the logical buffer to the new value immediately and supply this new increased value to the fullness detector 34. This causes the fullness detector to sense (actually compute) an underfilled buffer condition and the quantizer controller 38 adjusts the quantization size accordingly to increase the bit-rate coming from the quantizer 40 into the compressor 44 and in turn into the encoder buffer 20. When the $B_{min}$ condition is satisfied, block 74 senses this condition and passes control on to block 78.

On the other hand, if the $B_e$ constraint is not met, the buffer size controller might decrease the size of the logical buffer immediately to the new $B_e$ value. The fullness detector will sense an overfilled condition and the quantizer controller will adjust the quantization size accordingly to reduce the bit-rate coming from the quantizer into the compressor and in turn into the encoder buffer. When the new $B_e$ constraint is satisfied, block 74 senses this condition and passes control on to block 78.

Of course it is possible and probably preferable to not abruptly change the bit-rate value to the new value, especially when block 76 indicates that the fill condition of the encoder buffer is not within the new constraints. An abrupt change in bit-rate will abruptly change the quantization size, and if the new fill constraints are not met, this change will be great (i.e., to the limit of quantization size, either the largest possible or the smallest possible) to bring the buffer fullness within constraints as soon as possible. It is preferable in most circumstances to have the buffer size controller gradually change the value of R to $R_{new}$, especially when the buffer fill constraints are not met in block 76.

In block 78 the new values for $B_{min}$ and $B_e$ are implemented by the buffer size controller 50. As described above, this might be done gradually if desired. When these new values have been implemented (or at some point during a gradual change to the new values), the output bit-rate change to $R_{new}$ is approved (block 80) by the buffer size controller 50. This approval is conveyed to the channel-rate controller 52 and in turn to mux 24, where it is implemented. Of course, the change to the new rate by mux 24 theoretically could be gradual as well.

Multiplexer 24 takes data from different sources and multiplexes them according to a data scheduling technique that determines the packet slots that belong to the different sources. The data scheduler ensures that the decoder buffer does not overflow or underflow for a source i operating at rate $R_i$ and delay $\Delta_i T$ by transmitting over a period of time equal to the delay (where this window of time is a moving window) a number of bits between $R_i \Delta_i T(1-m_1)$ and $R_i \Delta_i T(1+m_2)$. An appropriate value for $m_1$ and $m_2$ is 0.02.

Although a particular embodiment of the present invention has been shown and described, many other embodiments that incorporate the teachings of this invention may be easily constructed by those skilled in this art. Furthermore, modifications, improvements and variations upon the described embodiment would be readily apparent to those of ordinary skill and may be made without departing from the spirit and scope of this invention, which is defined by the appended claims.

I claim:

1. Apparatus for transmitting an input signal to a destination, comprising:

an encoder for converting said input signal into successive coded digital signals at a variable encoding rate;

an encoder buffer having a variable effective size for receiving and temporarily storing said successive coded digital signals, said encoder buffer having a fullness value used by said encoder in determining a value for said variable encoding rate of said encoder, said fullness value of said encoder buffer being determined in reference to said variable effective size of said encoder buffer;

a communication system for receiving said successive coded digital signals from said encoder buffer at a variable bit-rate R and for delivering said successive coded digital signals to a destination; and a decoder at said destination for receiving said successive coded digital signals from said communication system and converting said successive coded digital signals into an output signal corresponding to said input signal and having a fixed delay $\Delta T$ relative to said input signal;

said encoder buffer having an effective size that increases with R.

2. Apparatus as defined in claim 1 wherein said encoder buffer has a physical size which is equal to or greater than said effective size of said encoder buffer.

3. Apparatus as defined in claim 1 wherein said encoder buffer has an effective size on the order of $R\Delta T$.

4. Apparatus as defined in claim 1 wherein said encoder buffer has an effective size approximately equal to $R\Delta T$.

5. Apparatus as defined in claim 1 wherein said decoder includes a decoder buffer for receiving said successive coded digital signals from said communication system, said decoder buffer having a size greater than approximately $R\Delta T$.

6. Apparatus for transmitting an input signal to a destination, comprising:

an encoder for converting said input signal into successive coded digital signals at a variable encoding rate;

an encoder buffer having a variable effective size for receiving and temporarily storing said successive coded digital signals;

a communication system for receiving said successive coded digital signals from said encoder buffer at a variable bit-rate R and for delivering said successive coded digital signals to a destination; and a decoder at said destination for receiving said successive coded digital signals from said communication system and converting said successive coded digital signals into an output signal corresponding to said input signal and having a fixed delay $\Delta T$ relative to said input signal;

said encoder buffer having an effective size that increases with R and wherein M is a total effective maximum buffering capacity of said communication system, said variable bit-rate R is an average bit-rate, said communication system operates at an instantaneous bit-rate that varies in a range from $R(1-m_1)$ to $R(1+m_2)$, wherein $m_1$ is a factor determined by a minimum instantaneous bit-rate and $m_2$ is a factor determined by a maximum instantaneous bit-rate, and said encoder buffer has an effective size approximately equal to $R\Delta T(1-m_1)-M$.

7. Apparatus as defined in claim 6 wherein said decoder includes a decoder buffer for receiving said successive coded digital signals from said communication system, and wherein $B_d$ is the size of said decoder buffer.

8. Apparatus as defined in claim 7 wherein said decoder buffer has a fixed size determined by a standards committee.

9. Apparatus as defined in claim 7 wherein said decoder buffer has a size greater that approximately $R\Delta T(1+m_2)$.

10. Apparatus as defined in claim 7 wherein said encoding rate is controlled so as to prevent said effective encoder buffer from underflowing or overflowing.

11. Apparatus as defined in claim 10 wherein $B_{min}$ is a minimum fill state of said effective encoder buffer and said encoding rate is controlled so as to keep said effective encoder from reaching a fill state less than said minimum fill state.

12. Apparatus as defined in claim 11 wherein said minimum fill state approximately is an amount by which said decoder buffer size is less than $R\Delta T(1+m_2)$.

13. Apparatus for transmitting an input signal to a destination, comprising:

an encoder for converting said input signal into successive coded digital signals at a variable encoding rate;

a logical encoder buffer of variable size for receiving and temporarily storing said successive coded digital signals;

a communication system for receiving said successive coded digital signals from said encoder buffer at a variable average bit-rate R and for delivering said successive coded digital signals to a destination;

a decoder at said destination for receiving said successive coded digital signals from said communication system and for converting said received successive coded digital signals into an output signal corresponding to said input signal and having a fixed delay $\Delta T$ relative to said input signal;

said encoder including:
an encoder buffer fullness detector for determining a current fullness state for said logical encoder buffer;
an encoding rate controller responsive to said current fullness state for varying said encoding rate so as to keep said logical encoder buffer from overflowing or underflowing; and
a logical encoder buffer size controller for increasing said size of said logical encoder buffer with R.

14. Apparatus as defined in claim 13 wherein said logical encoder buffer size controller maintains said logical encoder buffer at a size on the order of $R\Delta T$.

15. Apparatus as defined in claim 13 wherein said logical encoder buffer size controller maintains said logical encoder buffer at a size approximately equal to $R\Delta T$.

16. Apparatus for transmitting an input signal to a destination, comprising:

an encoder for converting said input signal into successive coded digital signals at a variable encoding rate;

a logical encoder buffer of variable size for receiving and temporarily storing said successive coded digital signals;

a communication system for receiving said successive coded digital signals from said encoder buffer at a variable average bit-rate R and for delivering said successive coded digital signals to a destination;

a decoder at said destination for receiving said successive coded digital signals from said communication system and for converting said received successive coded digital signals into an output signal corresponding to said input signal and having a fixed delay $\Delta T$ relative to said input signal;

said encoder buffer including:
an encoder buffer fullness detector for determining a current fullness state for said logical encoder buffer
an encoding rate controller responsive to said current fullness state for varying said encoding rate so as to keep said logical encoder buffer from overflowing or underflowing; and
a logical encoder buffer size controller for increasing said size of said logical encoder buffer with R and wherein M is a total effective maximum buffering capacity of said communication system, said communication system receives said successive coded digital signals at an instantaneous bit-rate that varies in a range from $R(1-m_1)$ to $R(1+m_2)$, wherein $m_1$ is a factor determined by a minimum instantaneous bit-rate and $m_2$ is a factor determined by a maximum instantaneous bit-rate, and said logical encoder buffer size controller maintains said logical encoder buffer at a size approximately equal to $R\Delta T(1-m_1)-M$.

17. Apparatus as defined in claim 16 wherein said encoding rate controller varies said encoding rate so as to keep said logical encoder buffer from reaching a fullness state corresponding to a fill of less than a minimum number of bits, wherein $B_{min}$ is said minimum number of bits.

18. Apparatus as defined in claim 17 wherein said encoding buffer fullness detector determines a current fullness state above $B_{min}$.

19. Apparatus as defined in claim 17 wherein said decoder includes a decoder buffer, $B_d$ is the size of said decoder buffer, and $B_{min}$ is approximately an amount by which $B_d$ is less than $R\Delta T(1+m_2)$.

20. Apparatus for transmitting an input signal to a destination, comprising:

an encoder for converting said input signal into successive coded digital signals at a variable encoding rate;

a logical encoder buffer of variable size for receiving and temporarily storing said successive coded digital signals;

a communication system for receiving said successive coded digital signals from said encoder buffer at a variable average bit-rate R and for delivering said successive coded digital signals to a destination; and a decoder at said destination for receiving said successive coded digital signals from said communication system and for converting said successive coded digital signal into an output signal corresponding to said input signal and having a fixed delay $\Delta T$ relative to said input signal;

said encoder including:
a quantizer for converting said input signal into successive quantized digital signals at a variable quantization size;
a compressor for converting said quantized digital signals into successive coded digital signals;
an encoder buffer fullness detector for determining a current fullness state for said logical encoder buffer;

a quantization size controller responsive to said current fullness state for varying said quantization size so as to keep said logical encoder buffer from overflowing or underflowing; and a logical buffer size controller for increasing said size of said logical encoder buffer with R.

21. Apparatus as defined in claim 20 wherein said logical buffer size controller maintains said logical encoder buffer at a size approximately equal to $R\Delta T$.

22. Apparatus for transmitting an input signal to a destination, comprising:

an encoder for converting said input signal into successive coded digital signals at a variable encoding rate;

a logical encoder buffer of variable size for receiving and temporarily storing said successive coded digital signals;

a communication system for receiving said successive coded digital signals from said encoder buffer at a variable average bit-rate R and for delivering said successive coded digital signals to a destination; and a decoder at said destination for receiving said successive coded digital signals from said communication system and for converting said successive coded digital signals into an output signal corresponding to said input signal and having a fixed delay $\Delta T$ relative to said input signal;

said encoder including:

a quantizer for converting said input signal into successive quantized digital signals at a variable quantization size;

a compressor for converting said quantized digital signals into successive coded digital signals;

an encoder buffer fullness detector for determining a current fullness state for said logical encoder buffer;

a quantization size controller responsive to said current fullness state for varying said quantization size so as to keep said logical encoder buffer from overflowing or underflowing; and a logical buffer size controller for increasing said size of said logical encoder buffer with R and wherein M is a total effective maximum buffering capacity of said communication system, said communication system receives said successive coded digital signals at an instantaneous bit-rate that varies in a range from $R(1-m_1)$ to $R(1+m_2)$, wherein $m_2$ is a factor determined by a minimum instantaneous bit-rate and $m_2$ is a factor determined by a maximum instantaneous bit-rate, and said logical encoder buffer size controller maintains said logical encoder buffer at a size approximately equal to $R\Delta T(1-m_1)-M$.

23. Apparatus as defined in claim 22 wherein $m_1$ and $m_2$ are on the order of 0.02.

24. Apparatus as defined in claim 22 wherein said communication system includes a channel-rate controller for determining an average bit-rate R at which said communication system receives said successive coded digital signals, said channel-rate controller and said logical encoder buffer size controller communicating to each other prospective changes in R.

25. Apparatus as defined in claim 24 wherein said logical encoder buffer size controller effectively changes said size of said logical encoder buffer in advance of changes in R in order to obtain an encoder buffer fullness state within limits when R changes.

* * * * *